United States Patent [19]

Fletcher

[11] Patent Number: 5,105,545
[45] Date of Patent: Apr. 21, 1992

[54] APPARATUS FOR MEASURING A WIDTH DIMENSION OF A HELICAL SURFACE

[75] Inventor: John R. Fletcher, Wichita, Kans.

[73] Assignee: The Boeing Company, Seattle, Wash.

[21] Appl. No.: 616,565

[22] Filed: Nov. 21, 1990

[51] Int. Cl.⁵ .......................... G01B 9/08; G01B 9/04; G01B 5/20

[52] U.S. Cl. ..................................... 33/201; 33/199 B; 33/712

[58] Field of Search ................ 33/199 R, 199 B, 201, 33/712, 545–547, 549, 551; 356/373, 376, 384

[56] References Cited

U.S. PATENT DOCUMENTS

| | | |
|---|---|---|
| 1,377,068 | 5/1921 | Hartness . |
| 1,703,933 | 3/1929 | Hartness et al. . |
| 1,737,579 | 12/1929 | Flanders et al. . |
| 1,745,537 | 2/1930 | Hartness . |
| 2,648,138 | 8/1953 | Gase ..................................... 33/201 |
| 3,155,383 | 11/1964 | Whitmore . |
| 3,167,869 | 2/1965 | Raney et al. . |
| 3,231,982 | 2/1966 | Ribich ..................................... 33/201 |
| 3,683,509 | 8/1972 | Kurz ..................................... 33/199 B |
| 4,193,317 | 3/1980 | Oono et al. . |
| 4,275,507 | 6/1981 | Von Haas ..................................... 33/199 B |
| 4,662,075 | 5/1987 | Mastel et al. ..................................... 33/201 |
| 4,682,766 | 7/1987 | Barkley . |

FOREIGN PATENT DOCUMENTS

| | | |
|---|---|---|
| 579697 | 7/1933 | Fed. Rep. of Germany . |
| 642165 | 2/1937 | Fed. Rep. of Germany . |
| 1921836 | 11/1970 | Fed. Rep. of Germany . |

Primary Examiner—William A. Cuchlinski, Jr.
Assistant Examiner—C. W. Fulton
Attorney, Agent, or Firm—Finnegan, Henderson, Farabow, Garrett & Dunner

[57] ABSTRACT

An apparatus for measuring the width dimension of a helical surface of an endmill. The apparatus includes a workholder capable of supporting an endmill in such a position as to optically magnify the surface of the endmill to be measured. The workholder further includes an index arbor capable of rotating the endmill to a selected helical surface. The workholder is slidably connected to an arcuate guidetrack mounted on a microscope platform.

10 Claims, 7 Drawing Sheets

APPARATUS FOR MEASURING A WIDTH DIMENSION OF A HELICAL SURFACE

BACKGROUND OF THE INVENTION

1. Field of the Invention

The present invention relates to a measuring apparatus; and more particularly, to an apparatus for measuring the dimensions of surfaces extending at different helical angles. Although the present invention is suitable for measuring dimensions of many different helical surfaces, it is particularly advantageous for measuring the land of endmills having a helical cutting surface, and will be specifically described in connection therewith.

2. Discussion of the Related Art

An endmill is similar to a drill bit, both are instruments used to cut or bore holes. The difference being a drill bit utilizes its point to cut; whereas an endmill utilizes side surfaces or lands to cut.

The traditional approach to measuring the land of an endmill is to place the endmill into clay or a block of wood and view the primary land with a microscope. There are a number of disadvantages associated with the traditional approach of measuring land width. The primary problem is obtaining accurate measurements. The placement of an endmill into clay or a block of wood inherently gives rise to unwanted movement of the endmill. Specifically, the block of wood becomes worn through use and increases the hole size associated with any given endmill diameter placed into the block. In addition, in order for an accurate measurement to be taken, the helical surface to be measured must be completely parallel to the platform of the microscope. To accurately place the endmill in such a position by using the traditional approach is nearly impossible. These problems are further compounded by the fact that the measuring procedure is required to be repeated throughout the work life of the endmill.

Another difficult obstacle to overcome, which is practically impossible using the traditional approach, is locating the place on the endmill which was initially measured in order to repeat the measuring procedure after its use.

Finally, the traditional approach is extraordinarily inefficient when considering the measuring procedure must take place on numerous endmills with various diameters and helical angles.

SUMMARY OF THE INVENTION

It is the object of the present invention to measure accurately the width dimension of a helical surface.

An additional object is to measure accurately and repeatedly the land width of an endmill.

A further object of the present invention is to provide an apparatus capable of efficiently measuring numerous endmills with varying diameters and helical angles.

Additional objects and advantages of the invention will be set forth in part in the description which follows, and in part will be obvious from the description, or may be formed by practice of the invention. The objects and advantages of the invention may be realized and obtained by means of the instrumentalities and combinations particularly pointed out in the appended claims.

To achieve the objects and in accordance with the purpose of the invention, as embodied and broadly described herein, an apparatus for measuring a width dimension of a surface which extends longitudinally at a predetermined helical angle relative to the axis of a shaft comprising: a platform defining a plane having x-y coordinates, means for optically magnifying an optical path, the magnifying means being disposed to direct the optical path towards the platform generally perpendicular to the plane, a workholder connected to the platform for fixedly supporting the shaft parallel to the platform, first means for selectively moving the platform relative to the optical path in both x and y coordinate directions for aligning a predetermined portion of the helical surface of the shaft with the optical path; second means for rotating the annular member to a selected index position for orienting a predetermined portion of the helical surface substantially orthogonal to the optical path; and third means including the workholder for substantially positioning the width dimension of the predetermined portion of the helical surface parallel to the direction of one of the x, y coordinate directions.

It is understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate a presently preferred embodiment of the invention, and together with the general description given above and detailed description of the preferred embodiment given below, serve to explain the principles of the invention.

DETAILED DESCRIPTION OF THE PREFERRED EMBODIMENT

Reference will now be made in detail to the present preferred embodiment of the present invention, an example of which is illustrated in the accompanying drawings.

Figure 1:
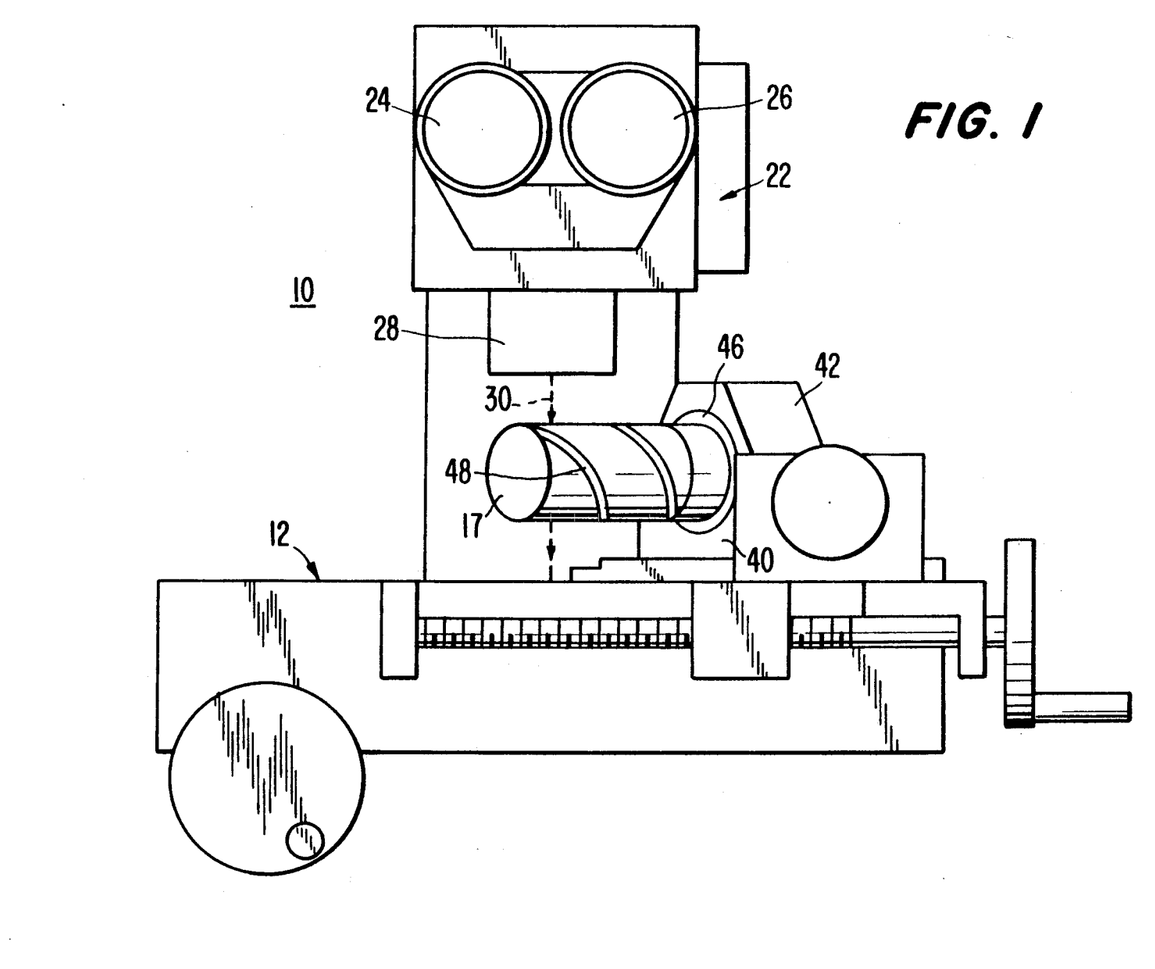
FIG. 1 is an elevational view of a preferred embodiment of the present invention.

Referring to FIG. 1, an apparatus for measuring a width dimension of a surface area 48 which extends longitudinally at a predetermined helical angle relative to the axis of a shaft 17 is generally referred to as 10. In accordance with the invention, the apparatus includes a platform defining a plane having x-y coordinates. As embodied herein, and referring to FIG. 2, a platform 12 is generally rectangular in configuration, and has an annular surface area portion 14. Surface area 14 defines a plane having x-y coordinates. A pair of spaced parallel dovetailed grooves 16, 18 are formed in annular surface portion 14 at opposed sides thereof. Surface area 14 of the platform 12 surrounds a central substantially rectangular recess defining a viewing area 20. Grooves 16, 18 which terminate on opposite sides of the viewing area 20 are used for selectively securing a clamp, as hereinafter described, on one or the other side of platform 12.

In accordance with the invention, the apparatus includes means for optically magnifying an optical path, the magnifying means being disposed to direct the optical path towards the platform generally perpendicular to the plane. As embodied herein, and referring to FIG. 1, the magnifying means is a microscope 22 mounted above and spaced from viewing area 20 of platform 12. Microscope 22 has a pair of viewing lenses 24 and 26 that are optically arranged with a magnifying lens 28 in a well known manner, to provide an optical path as represented by dashed line 30 which extends perpendicular to the plane defined by the surface 14 of platform 12. To view the object to be mounted, a person looks into viewing lenses 24 and 26 of microscope 22 and adjusts the magnification power to adequately view an object directly below magnifying lens 28 and along optical path 30.

Figure 4A:
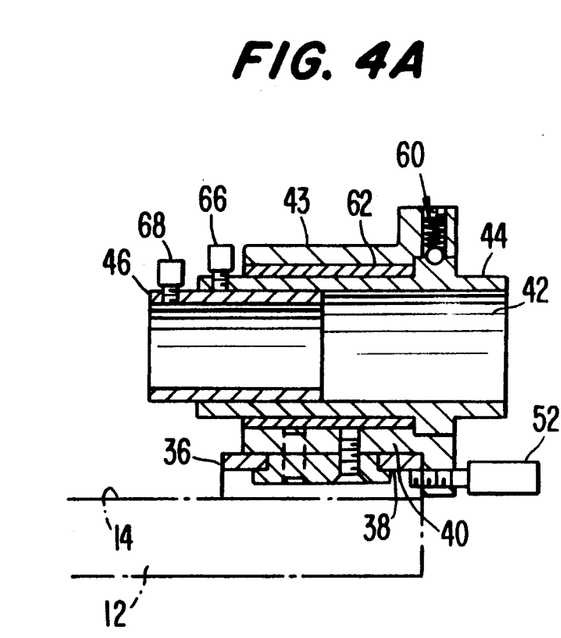
FIG. 4A is a cross-sectional view of the workholder assembly as depicted along line IV—IV of FIG. 2.
Figure 4B:
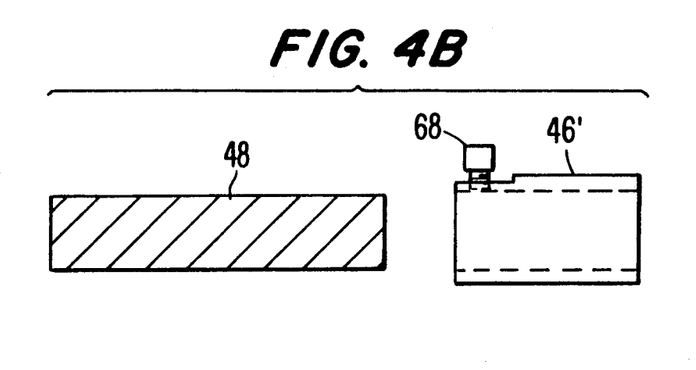
FIG. 4B is a cross-sectional view of an alternative annular member for receiving an endmill of small diameter.

The apparatus of the invention further includes a workholder connected to the platform for fixedly supporting the shaft parallel to the platform. As embodied herein and depicted in FIG. 4A, workholder 42 includes workholder housing 44 having an axial bore and being rotatably mounted in support 43. As described below, support 43 is moveably connected to platform 12. Workholder 42 further includes annular member 46 coaxially mounted in the bore of housing 44, the annular member having an axial bore for receiving the shaft of an object to be measured, such as endmill 48. Depending upon the size of the shaft of the object, different annular members 46 may be required. As depicted in FIG. 4B, an alternative annular member 46, may be used to accommodate endmill 48. The annular member 46, 46' serves as an interface between the object and the workholder. Annular member 46, 46' includes set screw 68 for securing the shaft of the object in the bore of the annular member. Workholder housing 44 includes set screw 66 to secure annular member 46 into the bore of the housing.

The apparatus of the invention also includes first means for selectively moving the platform relative to the optical path in both x and y coordinates for aligning a predetermined portion of the helical surface of the shaft with the optical path. As embodied herein, platform 12 is associated with microscope 22 which has the capability of moving its viewing platform 12 from side to side, and in backward and forward directions along x and y coordinates in a conventional manner. The microscope 22 provides the user with platform location information, i.e., x and y coordinates (not shown) in relation to the optical path 30 of the magnifying lens 28.

Figure 5:
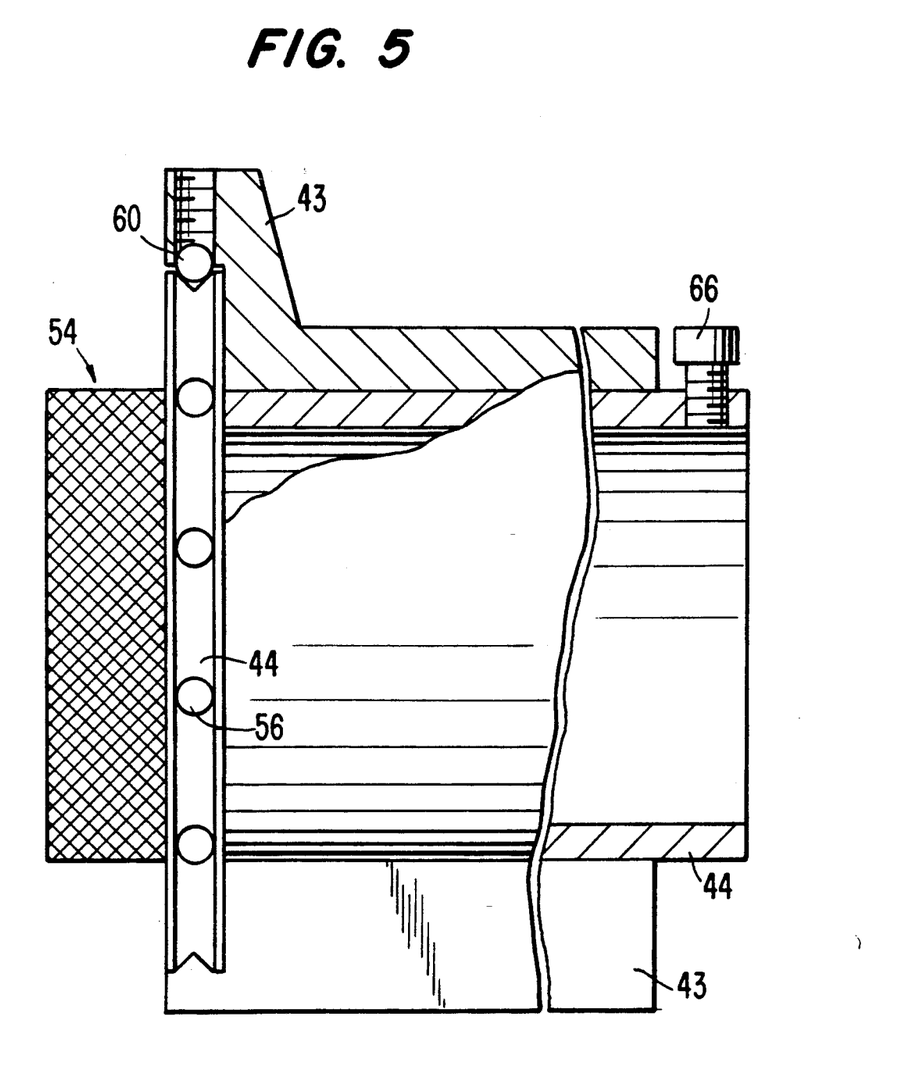
FIG. 5 is an enlarged, partially cut away view of the index arbor mechanism.

In accordance with the invention, the apparatus includes second means for rotating the shaft about its axis to a selected index position for orienting the predetermined portion of the helical surface substantially orthogonal to the optical path 30. As embodied herein, and referring to FIG. 5, index arbor 54 is coaxially fixed to one end of housing 44. Index arbor 54 has female detents 56 equally spaced circumferentially around the one end of housing 44. Detents 56 are disposed for selective engagement by spring-biased ball 60 supported in support 43. This configuration allows for the rotation of the annular member 46 by hand turning the knurled portion 55 of index arbor 54 at the outer most portion of the workholder assembly farthest from the optical path 30. A bronze bushing 62 is inserted between the housing 44 and support 43 to provide a slip fit between them.

In accordance with the invention, the apparatus includes third means including the workholder for substantially positioning the width dimension of the predetermined portion of the helical surface parallel to the direction of one of the x, y coordinates.

Figure 2:
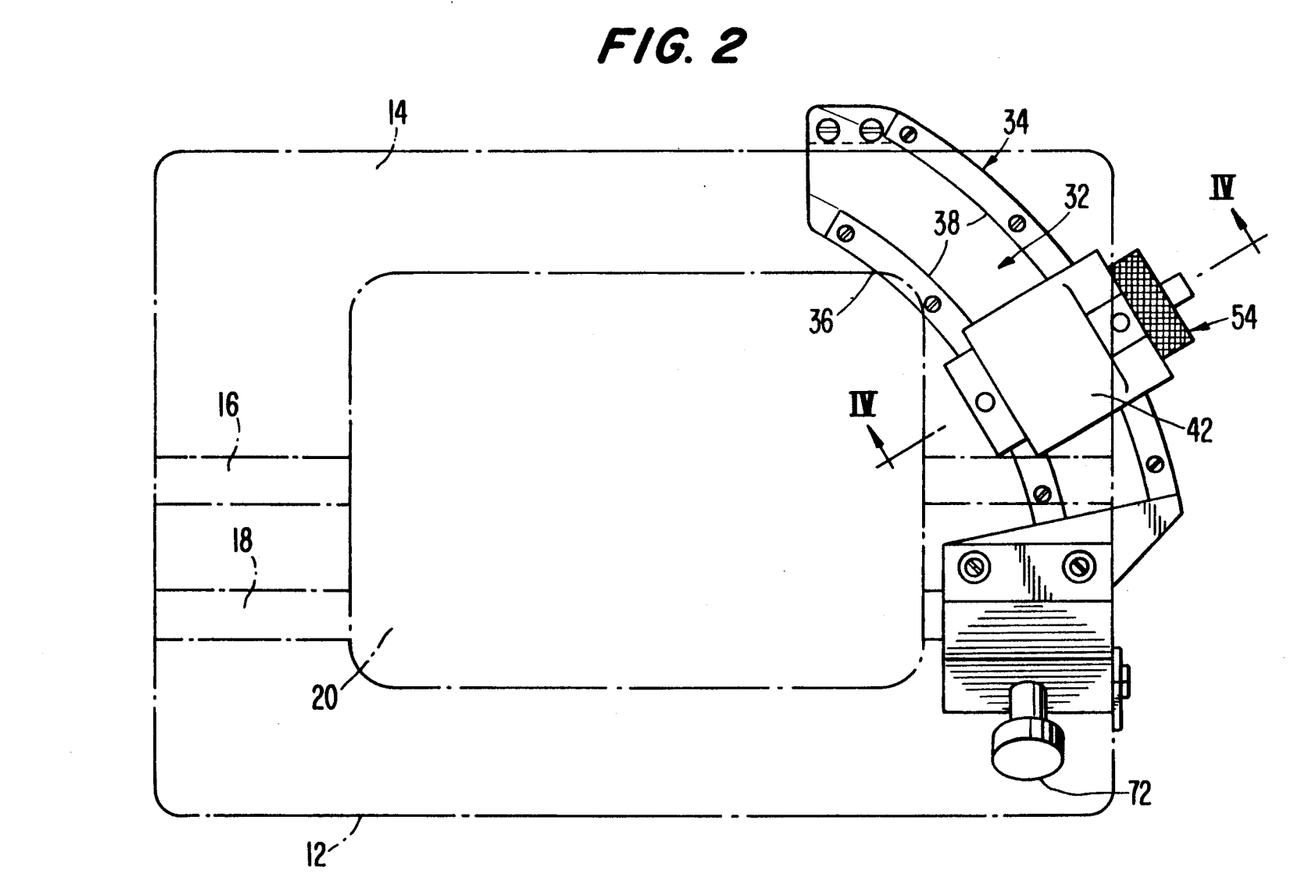
FIG. 2 is a plan view of the platform and workholder assembly of the apparatus of FIG. 1.

As embodied herein, and referring to FIG. 2, the third means comprises an arcuate guidetrack 32 having a pair of spaced substantially parallel rails 34 and 36 for slidably supporting the workholder 42. The arcuate guidetrack 32 having a predetermined arc length is mounted on the surface area of the platform with a radial center point in registry with the viewing area capable of intersecting the optical path at times when the platform is in a predetermined position. The effect of the curvature of the guidetrack is dependent upon range of the helical angles of the surface to be measured. The workholder 42 is capable of sufficient movement along the guidetrack 32 to allow the object to be measured to be placed in the proper position, i.e., within the viewing area 20 with the surface of the predetermined portion of the object being parallel to the x or y coordinates of platform 12.

Preferably, the apparatus includes a first clamp for securing the workholder in a selected position along the arcuate guidetrack. Referring to FIG. 4, in order to ensure that the workholder 42 does not move during the measuring process, a clamping or fastening mechanism has been incorporated. The workholder 42 which is capable of being slidably moved along the guidetrack 32, once correctly positioned for viewing, is secured by hand screw 52. The hand screw 52 allows the user to conveniently move workholder 42 to a selected position and tighten screw 52 to avoid inadvertent movement of the workholder 42. The hand screw 52 is located at the base portion 40 of the workholder support 43 such that when tightened, the flat end of the hand screw 52 abuts against the outer rail 34 of guidetrack 32.

Figure 3:
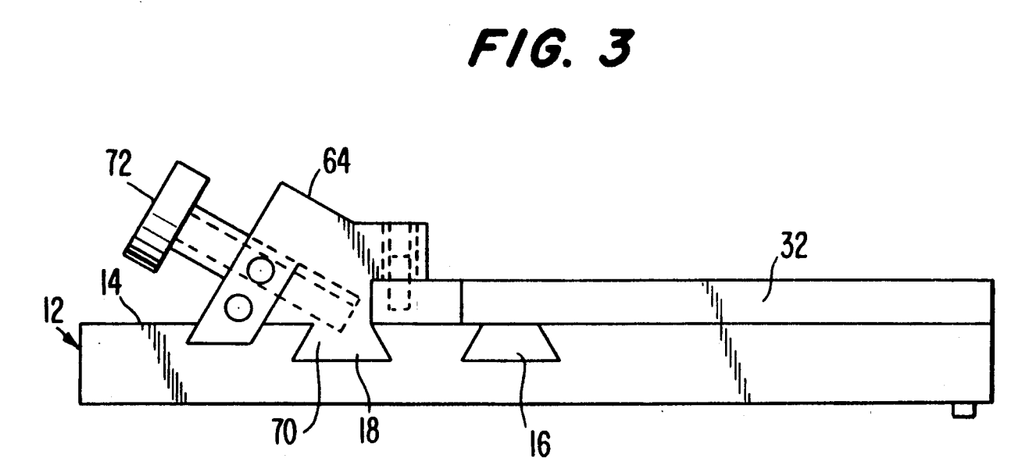
FIG. 3 is a side view of the platform and guidetrack clamp.

The apparatus preferably further includes a second clamp for securing the guidetrack to the platform of the microscope. As depicted in FIG. 3, second clamp 64 is configured in the form of an elongated C-shaped structure with a dovetailed projection 70 slidably inserted into one of the parallel dovetailed grooves 16 or 18 formed in the platform 12 of the microscope 22. Bolt 72 is threadably inserted in the C-shaped structure for holding the guidetrack 32 laterally in position on the platform 12.

Figure 6:
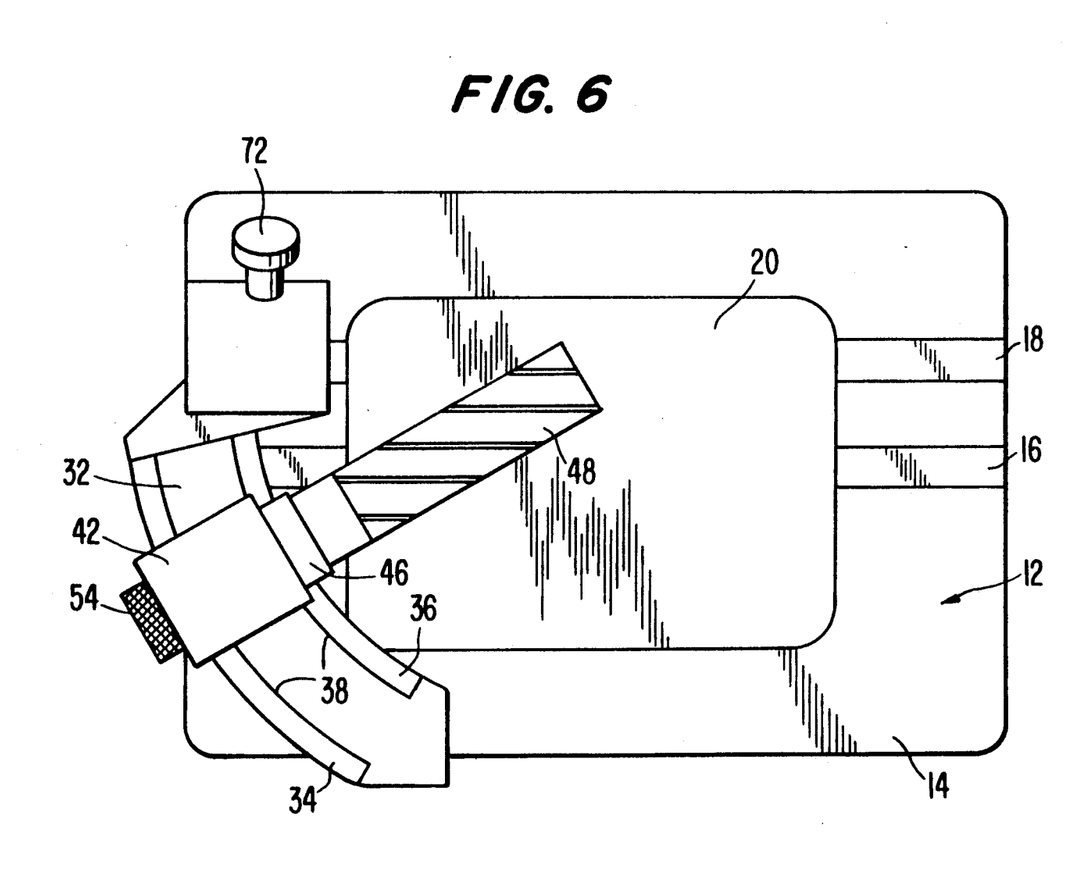
FIG. 6 is a top view of the platform, guidetrack and workholder assembly with an endmill in a position to be measured.

In operation, the user of the claimed invention would place the endmill 48 into the bore of annular member 46, fastening it into place by tightening set screw 68. Annular member 46 is secured into the bore of housing 44 by set screw 66. As shown in FIG. 6, after the endmill 48 has been inserted into workholder 42, the workholder may be positioned at any point along the arc length of arcuate guidetrack 32. The determination of where to position workholder 42 is dependent upon the helical angle of the surface of the endmill to be measured. Using the microscope 22, the user can view where along the shaft of the endmill 48 which helical surface is to be measured either before or after the endmill is to be used. The platform 12, can be moved in either an x or y direction to view the desired location.

Since there are numerous helical surfaces on an endmill, it is often necessary or desirable to measure more than one. By rotating the endmill 48, using the index arbor 54, and repositioning the platform 12 in either an x and/or y-direction, the user is capable of viewing and measuring multiple surfaces in an efficient manner without having to remove the endmill 48, from the workholder 42.

Figure 7:
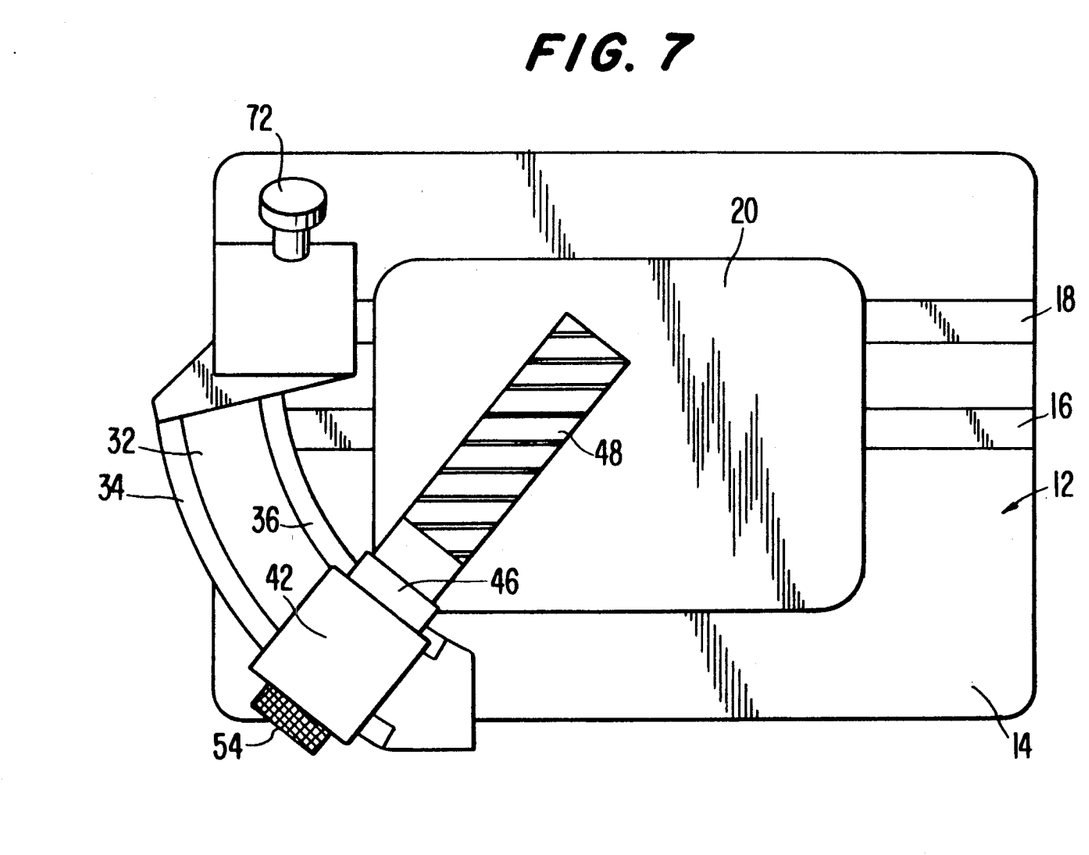
FIG. 7 is a view similar to FIG. 6 illustrating a measuring position for an endmill having a helical angle different than the endmill of FIG. 6.

This method of measuring the helical surfaces of endmills can be repeated on endmills having various helical angles. As shown in FIG. 7, the workholder easily can be moved along the arcuate guidetrack 32 to a new position which allows for proper alignment of the helical surface with the x and y axis.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for measuring a width dimension of a surface which extends longitudinally at a predetermined helical angle relative to the axis of a shaft, comprising:
    a platform defining a plane having x-y coordinates;
    means for optically magnifying an optical path, the magnifying means being disposed to direct the optical path towards the platform generally perpendicular to the plane;
    a workholder connected to the platform for fixedly supporting the shaft parallel to the platform;
    first means for selectively moving the platform relative to the optical path in both x and y coordinates for aligning a predetermined portion of the helical surface of the shaft with the optical path;
    second means for rotating the shaft about its axis to a selected index position for orienting the predetermined portion of the helical surface substantially orthogonal to the optical path; and
    third means including the workholder for substantially positioning the width dimension of the predetermined portion of the helical surface parallel to the direction of one of the x, y coordinates.

2. The apparatus of claim 1 wherein the magnifying means is a microscope.

3. The apparatus of claim 1 wherein the workholder includes a base portion defining a bore and an annular member coaxially received in the bore for rotation about its axis.

4. The apparatus of claim 3 wherein the annular member has a bore for selectively receiving the shaft and including means for holding said shaft against rotation relative to the annular member.

5. The apparatus of claim 1 wherein the second means includes an index arbor fixed to one end of the workholder, the index arbor including a plurality of equally spaced female detents circumferentially disposed around the one end of the workholder housing for selective engagement by a spring biased ball.

6. The apparatus of claim 1 wherein the third means includes an arcuate guidetrack for slidably supporting the workholder, and means for selectively securing the workholder in a selected position along the arcuate guidetrack.

7. The apparatus of claim 6 further comprising means for removably attaching the guidetrack to the platform in a predetermined position.

8. A workholder for positioning an endmill, having a plurality of helically extending lands each defining a cutting edge, in a selected fixed position on a platform of a microscope for determining the width of the lands, said workholder comprising:
    a workholder support connected to the platform for selective movement parallel to the plane thereof;
    a workholder housing, coaxially connected to said workholder support, having a bore for supportingly receiving a shaft of an endmill; and
    an index arbor at one end of the workholder housing for selectively rotating an endmill received in said housing to a plurality of predetermined positions wherein the land of the endmill is substantially orthogonal to an optical path of the microscope.

9. The workholder of claim 8 wherein the index arbor includes a spring-biased ball disposed in said support for selective engagement with each of a plurality of female detents in the one end of the housing.

10. An apparatus for measuring a width dimension of each of a plurality of spaced helically extending lands of an endmill, the apparatus comprising:
    a microscope having an optical path;
    a platform having a surface area extending in a first plane, the platform being moveably connected to the microscope, the plane of the platform being perpendicular to the optical path;
    an arcuate guidetrack defining an arc length and being removably mounted on the platform, the radial centerpoint of the guidetrack capable of intersecting the optical path at times when the platform is in a predetermined position with respect to the microscope;
    a workholder mounted on the guidetrack for selective movement along the arc length, the workholder including a workholder support axially extending parallel to the plane of the platform, a workholder housing coaxially, rotatably carried by the support, the workholder housing having a bore for receiving one end of the endmill, an index arbor fixed to one end of the workholder housing for selectively rotating the workholder housing and endmill therein about its axis between predetermined, circumfer-entially-spaced radial positions;
    a first clamp for securing said workholder in a selected position along the arcuate guidetrack, and
    a second clamp for securing the guidetrack to the platform of the microscope.

* * * * *